United States Patent [19]

Anstey

[11] Patent Number: 5,005,747
[45] Date of Patent: Apr. 9, 1991

[54] MOUNTING FOR THE SPIRAL FLIGHTS AT THE OPPOSITE ENDS OF A BALE WRAPPING MATERIAL SPREADER ROLL

[75] Inventor: Henry D. Anstey, Ottumwa, Iowa
[73] Assignee: Deere & Company, Moline, Ill.
[21] Appl. No.: 370,538
[22] Filed: Jun. 23, 1989
[51] Int. Cl.$^5$ .................. B23P 11/02; B23P 19/04
[52] U.S. Cl. .................................. 226/190; 26/87; 26/99; 29/450; 29/525; 29/235
[58] Field of Search ............... 242/76, 29, 226; 26/87, 26/97, 99, 105; 29/450, 452, 525, 235, 157.3 AH; 226/190; 267/179

[56] References Cited

U.S. PATENT DOCUMENTS

| | | | |
|---|---|---|---|
| 446,203 | 2/1891 | Cochennour et al. | 267/179 X |
| 1,957,506 | 5/1934 | Smellie | 26/105 X |
| 3,100,930 | 8/1963 | Niblen et al. | 29/157.3 AH |
| 3,713,190 | 1/1973 | Yazama et al. | 26/99 X |
| 4,403,561 | 9/1983 | Schaeflern et al. | 267/179 X |
| 4,589,497 | 5/1986 | Kane et al. | 29/452 X |
| 4,729,213 | 3/1988 | Raes | 226/190 X |

FOREIGN PATENT DOCUMENTS

| | | | |
|---|---|---|---|
| 47-4738 | 2/1972 | Japan | 26/87 |
| 2144199 | 2/1985 | United Kingdom | 267/179 |

Primary Examiner—Daniel P. Stodola
Assistant Examiner—Paul Thomas Bowen

[57] ABSTRACT

A wrap material spreader roll includes a smooth, cylindrical tube having spiral flights at opposite end portions thereof formed from spirally wound elongate members such as wires, or the like, the elongate members having respective inner ends defined by a radially inwardly projecting portion which is received in a respective hole provided in the tube. The spreader roll is mounted to opposite support walls by respective standard bolts having hexagonal flange heads received in hexagonal bores provided in the inner races of a pair of roller bearings that are pressed into the opposite ends of the tube, the bolts having respective threaded stems received in the smaller lower portions of keyhole-shaped openings provided in the walls and having flange nuts received thereon.

7 Claims, 1 Drawing Sheet

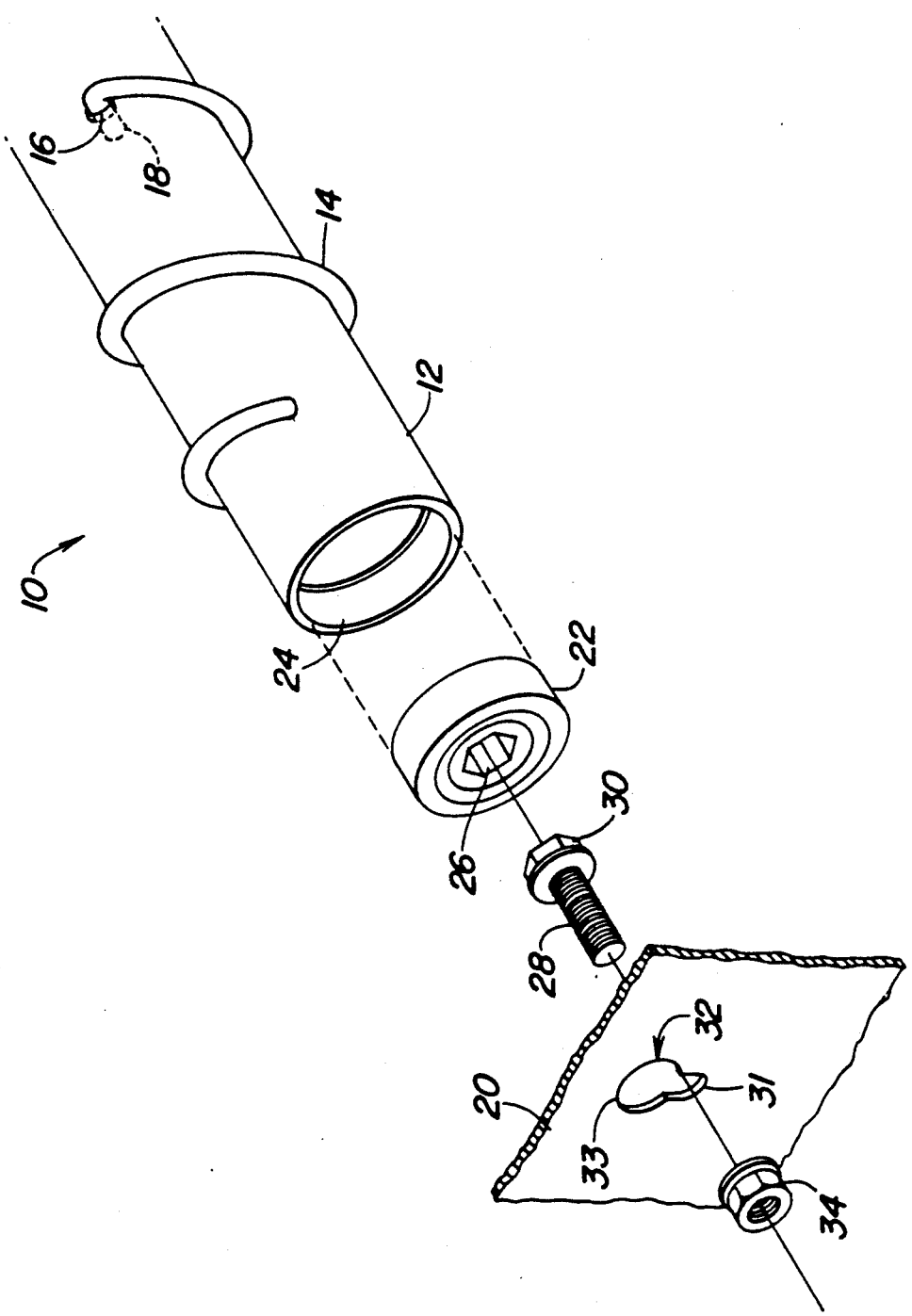

MOUNTING FOR THE SPIRAL FLIGHTS AT THE OPPOSITE ENDS OF A BALE WRAPPING MATERIAL SPREADER ROLL

BACKGROUND OF THE INVENTION

The present invention relates to a spreader roll incorporated in a mechanism for feeding wrap material, such as plastic sheeting or net, for enveloping large round bales, formed in a bale-forming chamber and more particularly relates to the mounting of spiral flighting provided at the opposite ends of the spreader roll chamber for ensuring that the material is spread to its full width before it is fed into the bale-forming chamber.

U.S. Pat. No. 4,729,213, granted on Mar. 8, 1988, discloses a large round baler equipped with a bale enveloping or wrapping mechanism which includes a spreader roll of the above-described type. The spreader roll of this patent comprises a smooth cylindrical roll having circular cross-section wire spirally wound onto the opposite ends thereof so as to define spiral flights of opposite hand. These flights are held in place by welds applied at various locations along their length. The application of such welds requires special care to be taken in order that the spiral wire and tubing be joined together without leaving gaps, protrusions or sharp unfilled areas or slag that might snag and cause wrapping material to be wound about the roll. This is usually done by grinding and etc. after welding.

SUMMARY OF THE INVENTION

According to the present invention there is provided an improved spreader roll and more particularly there is provided an improved way of mounting spirally wound wire on the opposite end portions of a smooth cylindrical tube so as to form spiral flights on the tube.

An object of the invention is to fix a spirally formed elongate member to each of the opposite end portions of a tube without using welds.

Yet a more specific object of the invention is to fix spirally wound elongate members such as wires, straps or rods or the like to the opposite ends of a tube by winding the elongate member to a diameter resulting in the member tightly engaging the surface of the tube when received thereon and by providing the member with a radially inwardly projecting end that is received in an aperture provided in the tube.

These and other objects will become apparent from a reading of the ensuing description together with the appended drawing.

BRIEF DESCRIPTION OF THE DRAWING

The sole FIGURE is a partially exploded perspective view of an end portion of a spreader roll constructed in accordance with the principles of the present invention and showing the manner of rotatably mounting the roll.

DESCRIPTION OF THE PREFERRED EMBODIMENT

Referring to the drawing, there is shown an end section of a bale wrap material spreader roll 10 including a smooth tube 12 having spiral flighting 14 thereon for engaging wrap material and augering it toward the outer end of tube, it being noted that similar but oppositely wound flighting is positioned on the opposite end portion of the tube for augering the wrap material towards the opposite end of the tube. In this way the wrap material is spread across the length of the roll 10 by the action of the flighting.

The flighting 14 is here shown as being comprised of a spirally wound wire of circular cross-section which is wound, when free of the tube 12, to a diameter slightly less than that of the outside diameter of the tube so that the wire will tightly engage the periphery of the tube when mounted thereon. It is to be understood however that the flighting may be made of any elongate strap or bar material having a surface characteristic suitable for engaging the material to be moved thereby. In any event, the mounting of the flighting is accomplished by fixturing the spirally wound member in a manner permitting it to be forcibly "unwound" so as to increase its internal diameter to permit the insertion of the tube thereinto. The tube 12 is provided with an aperture 16 spaced lengthwise from the end of the tube and, in addition to being spirally wound, the wire is formed so as to have a radially inwardly projecting end 18 that is received in the aperture 16.

Rotation of the spreader roll 10 is caused by its frictional engagement with wrap material as the latter is pulled from a supply roll by driven feed rolls or by a bale being rotated in the bale-forming chamber. The spreader roll 10 extends between opposite support walls 20 (only one shown) and is rotatably supported thereby through identical means including a roller bearing 22 having its outer race pressed into an annular recess 24 provided inside the end of the tube 12 and having a hexagonal bore 26 provided through its inner race. The mounting of each end is completed by a bolt 28 having a hexagonal flange head 30 tightly received in the bore 26 of the inner race of the bearing 22, with a threaded stem of the bolt extending outwardly through a lower smaller portion 31 of a keyhole-shaped opening 32, having an upper larger portion provided in the support wall 18 and with a flange nut 34 being received on the stem.

Thus, it will be appreciated that the flighting 14 is secured on the tube 12 by a tight frictional fit and by the radially extending end 18 being received in the aperture 16 and that this securement is made without necessitating grinding as would be the case if the spirally wound member were secured by welding.

I claim:

1. In a roll including a smooth, cylindrical tube having a spirally wound elongate member received thereon and secured thereto to form flighting thereabout, the improvement comprising: said elongate member being wound so as to have an inside diameter slightly less than an outside diameter of said tube when the elongate member is free of said tube, whereby a frictional fit is established between the tube and elongate member when the latter is received on the former; one end of said elongate member being defined by a radially inwardly directed projection; and said tube having a hole extending radially therethrough and receiving said one end of said elongate member to establish a connection which works in combination with the frictional fit as means for connecting the elongate member to the tube.

2. In a roll as defined in claim 1 wherein said elongate member has radiused, exposed surface portions.

3. In a roll as defined in claim 1 wherein said elongate member is circular in cross section.

4. In a bale wrap material spreader roll including a smooth cylindrical tube having flighting thereon defined by a spirally wound, elongate member, the improvement comprising: said elongate member being wound so as to have an inside diameter slightly less than an outside diameter of said tube whereby a tight frictional fit is established between the elongate member and said tube when the former is received on the latter; and said elongate member having a radially inwardly projecting end received in an aperture provided in the tube, with said frictional fit and inwardly projecting end received in the aperture cooperating to form sole means by which the flighting is held on the cylindrical tube.

5. In a bale wrap material spreader roll as defined in claim 4 wherein said elongate member includes a smooth exterior surface facing away from said cylindrical tube.

6. In a bale wrap material spreader roll as defined in claim 5 wherein said elongate member is circular in cross section.

7. In a bale wrap material spreader roll as defined in claim 6 where in said elongate member is a wire.

* * * * *